(12) United States Patent
Blackwell et al.

(10) Patent No.: US 7,547,176 B2
(45) Date of Patent: Jun. 16, 2009

(54) POSITIONAL CONTAINER LOADING AND CHUTE SENSOR

(75) Inventors: Wayne M. Blackwell, Chenango Forks, NY (US); Mark Grandstaff, Muskogee, OK (US)

(73) Assignee: Lockheed Martin Corp., Bethesda, MD (US)

( * ) Notice: Subject to any disclaimer, the term of this patent is extended or adjusted under 35 U.S.C. 154(b) by 939 days.

(21) Appl. No.: 10/602,711

(22) Filed: Jun. 25, 2003

(65) Prior Publication Data

US 2004/0265101 A1 Dec. 30, 2004

(51) Int. Cl.
B65B 21/02 (2006.01)
B65B 1/04 (2006.01)
B65B 43/42 (2006.01)

(52) U.S. Cl. .................. 414/419; 414/414; 414/425; 53/245; 53/535; 141/153

(58) Field of Classification Search .................. 414/419, 414/420, 421, 425, 294, 296; 198/536, 550.2, 198/524, 418, 444, 443; 53/475
See application file for complete search history.

(56) References Cited

U.S. PATENT DOCUMENTS

| | | | | |
|---|---|---|---|---|
| 2,962,172 A | * | 11/1960 | Fath et al. | 414/268 |
| 3,229,444 A | * | 1/1966 | Rouse | 53/245 |
| 3,602,383 A | * | 8/1971 | Howat | 414/414 |
| 3,717,270 A | * | 2/1973 | Rooke et al. | 414/414 |
| 4,062,168 A | * | 12/1977 | Watts et al. | 53/64 |
| 4,524,566 A | | 6/1985 | Hauers et al. | |
| 4,534,156 A | * | 8/1985 | Smith | 53/503 |
| 4,875,327 A | * | 10/1989 | Wilde | 53/475 |
| 5,558,485 A | * | 9/1996 | Haynes | 414/421 |
| 5,611,193 A | | 3/1997 | Farrelly | |
| 5,632,589 A | * | 5/1997 | Bray et al. | 414/339 |
| 5,797,716 A | * | 8/1998 | Herrin | 414/420 |
| 5,865,590 A | * | 2/1999 | Lilley | 414/420 |
| 5,992,186 A | * | 11/1999 | Fesmire et al. | 68/210 |
| 2001/0012482 A1 | * | 8/2001 | Vezina | 414/419 |
| 2002/0122714 A1 | * | 9/2002 | Derby et al. | 414/583 |
| 2004/0098948 A1 | * | 5/2004 | Caporali et al. | 53/443 |

FOREIGN PATENT DOCUMENTS

| | | |
|---|---|---|
| DE | 2054991 | 5/1972 |
| FR | 2228673 | 1/1975 |
| SU | 1426908 | 9/1988 |
| WO | WO 83/04401 | 12/1983 |

* cited by examiner

*Primary Examiner*—Gregory W Adams
(74) *Attorney, Agent, or Firm*—Greenblum & Bernstein, P.L.C.

(57) ABSTRACT

A system and method for loading mail objects. The system includes a bucket assembly which holds variable sized mail holding containers. An actuator system moves the bucket assembly between at least an upright position, an intermediate tilt position and a fully tilt position. At least one sensor detects whether any of the variable sized mail holding containers has reached a fill capacity at each of the upright position, the intermediate tilt position and the fully tilt position. A feedback control system controls an indexing of the bucket assembly, via the actuator system, between the upright position, the intermediate tilt position and the fully tilt position. In the intermediate position, packages or other mail objects are permitted to settle within any of the variable sized mail holding containers such that additional packages or other mail objects can be introduced into the any of the variable sized mail holding containers in the intermediate position. A method and control system is provided for implementing the steps of the loading system.

18 Claims, 8 Drawing Sheets

POSITIONAL CONTAINER LOADING AND CHUTE SENSOR

BACKGROUND OF THE INVENTION

1. Field of the Invention

The present invention generally relates to a loading assembly and method of use and, more particularly, to a loading assembly to effectuate the positioning and loading of mail objects in variable sized containers.

2. Background Description

There has been an increased demand on postal systems and other mail handling facilities, worldwide, to automate the mail processing systems in order to increase the mail delivery efficiency and reduce associated costs. These automated systems vary from sorting and sequencing of mail objects such as packages, flats, mail pieces and the like to a host of other front end and back end processes. These many processes, whether front end or back end processes, are very complex tasks and time consuming processes. In some instance, these processes even having a tendency, in one example, to damage the mail pieces. In other instances, improvements may be needed to increase capacity and throughput of these systems.

In general, most modern postal and other type of mail handling facilities have taken major steps toward automation by the implementation of a number of technologies. These technologies include, amongst others, letter sorters, parcel sorters, advanced tray conveyors, flat sorters, package handling systems and the like. As a result of these developments, postal facilities and other mail handling facilities have become quite automated over the years, considerably reducing overhead costs. However, even in this automated environment, there are still many potential improvements to these technologies which can vastly improve the throughput and other efficiencies of the mail handling systems.

By way of example, the sorting of mail objects such as letters, flats and packages are processed though many stages, including front end processes. In one front end process, the mail objects and more particularly packages are initially provided in containers in an unsorted condition. At this stage, the packages are lifted and placed onto open trays, with a single package on a single tray. The trays are conveyed about any known type of transport system such as a monorail type transport or other known carousel system. In the monorail type system, for example, several hundred drop-off or unloading points are located along the travel path of the trays, with chutes providing a pathway between the trays and containers located at each drop off point. The trays can tilt between a fully upright, transporting position to a tilted, unloading position such that the packages can be transported from an initial loading or induction area to an unloading point for subsequent processing or mail delivery.

At respective "drop off" or unloading points, a tray may be tilted to a certain angle to discharge or unload the package from the tray and into a respective container. This unloading point is typically determined by a code placed on the package associated with a delivery point or address of the package, any of which may be read by an optical reader prior to or during the transporting of the package, itself. This code may be any known code and is typically associated with a look-up table such that every package associated with a certain delivery point will be assigned to a respective and associated unloading point. Any well-known algorithm may be utilized to process the packages to a respective unloading point.

To minimize damage to the package, the package may be ejected onto the chute and slide into the container at the appropriate unloading point for further processing. In an attempt to minimize the damage to the packages, the container may be tilted between two positions, an initial filling position and a second, fully loaded position, via a handling system. Once the container is loaded, determined by the blockage of one or more strategically placed photocells, the container is then removed from the system and presented for post processing, i.e., further sorting and sequencing or mail delivery. At the time of removal, another container may be placed at that unloading position so that the introduction of further packages is possible.

Although known package automated systems provide many advantages over manual systems, postal and other type of mail handling facilities still demand further throughput and package handling efficiencies. These additional efficiencies may include, for example, more flexibility in order to utilizing a host of different sized containers, depending on the size and number of packages, etc., in addition to minimizing damage to the packages during the loading process. For example, in using known systems, the package has a tendency to impact on the rear of the container at a much further drop point thus potentially damaging the package.

Additionally, the sensors have a tendency to falsely detect a full container leading to an inefficient use of container space. To be more specific, the container is indexed to the untitled position after a strategically placed photocell becomes blocked by packages within the container. But, the sensors can become blocked prior to the container being completely filled for various reasons, some of which are attributed to the placement of the photocells to the actual titling positions of the container. In fact, packages within the container may not properly settle at the known tilt angles thus leading to an inefficient use of the container space and decreased throughput. But, these systems still provide many advantages over manual systems.

The present invention is directed to overcoming one or more of the problems as set forth above.

SUMMARY OF THE INVENTION

In a first aspect of the invention, an apparatus includes a bucket assembly which holds a container and an actuator system which moves the bucket assembly between at least an upright position, an intermediate tilt position and a full tilt position. At least one sensor detects whether the container has reached a fill capacity at each of the upright position, the intermediate tilt position and the full tilt position. A feedback control system controls an indexing of the bucket assembly, via the actuator system, between the upright position, the intermediate tilt position and the full tilt position. In the intermediate position, packages or other mail objects are permitted to settle within the container such that additional packages or other mail objects can be introduced into the container in the intermediate position.

In a second aspect of the invention, a loading system includes a transporting and sorting system and a loading apparatus. The transporting and sorting system includes an induction mechanism that introduces packages onto a transporting system which transports the packages from the induction mechanism to a plurality of drop off positions. A chute is associated with each of the plurality of drop off positions. The loading apparatus includes a bucket assembly and an actuator system which moves the bucket assembly between at least an upright position, an intermediate tilt position and another tilt position. At least one sensor detects whether the container has reached a fill capacity at each of the positions. A feedback control system controls an indexing of the bucket assembly.

In another aspect of the invention, a method for loading packages is provided. In this method, a container is placed in a first tilt position and the container is detected as being full at the first tilt position. The container is then indexed to an intermediate tilt position to enable settling of contents within the container. The container is detected full at the intermediate tilt position and is indexed to an upright position.

In yet another aspect of the invention, a control system for loading package includes a module which detects when the container is full at a first tilt position, an intermediate tilt position and an upright position. A module detects a position of the container and a module controls a movement of the container based at least on a capacity of the container.

DETAILED DESCRIPTION OF EMBODIMENTS OF THE INVENTION

The invention is directed to a system and method for effectuating the automated positioning and loading of mail objects and more specifically packages in variable sized containers. The invention is capable of accommodating and determining a specific sized container loaded within a bucket such as, for example, a full sized container to a half sized container and the like. The invention is further capable of filling a container to full capacity as well as making such a determination. In an embodiment, the invention is capable of raising and titling the container to various tilt angles in order to minimize package damage as well as maximize package throughput. The bucket, itself, is also designed to minimize package damage due to impact on the wall of the bucket. By using the method and system of the invention, sorting packages, modified to known transport systems, is increased thus minimizing cost overheads such as damage to packages, mishandling of packages and the like.

EMBODIMENTS OF SYSTEM OF THE INVENTION

Figure 1:
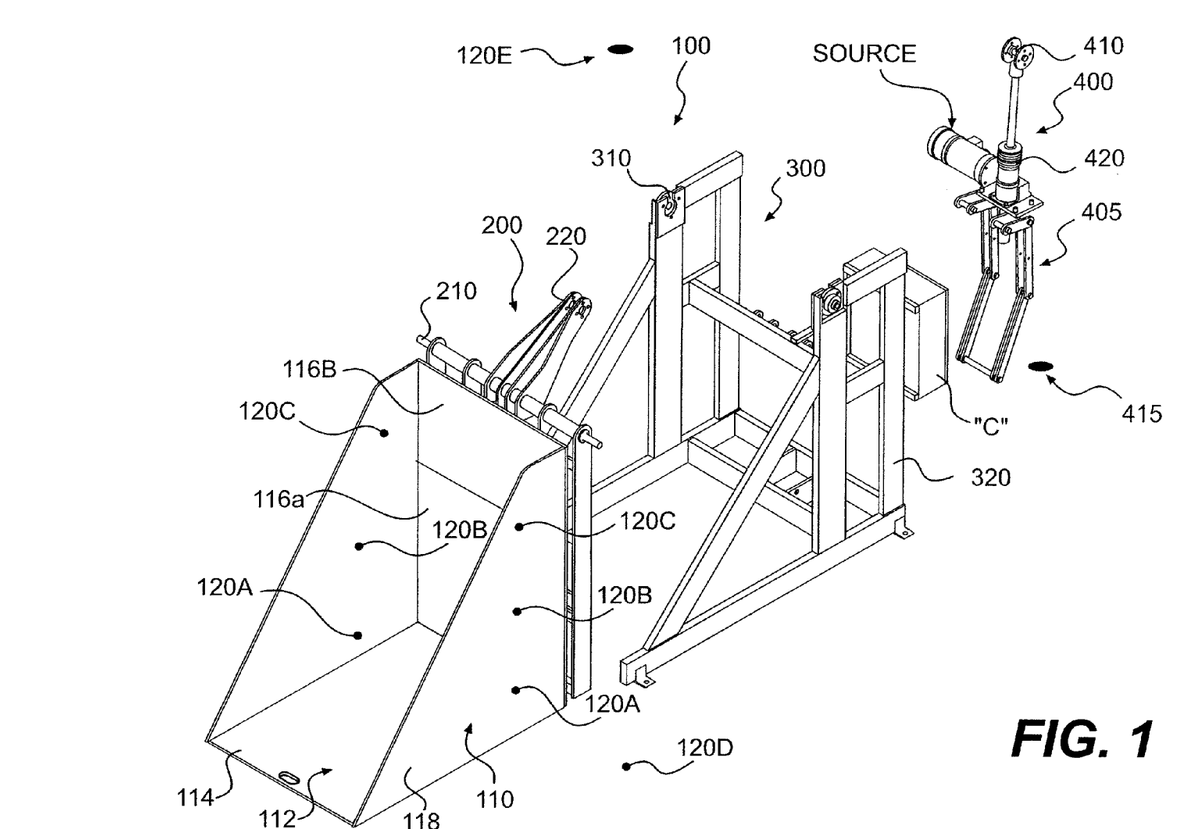
FIG. 1 shows an exploded view of an embodiment of the system of the invention.

FIG. 1 shows an exploded view of an embodiment of the invention. The loading apparatus is generally depicted as reference numeral 100 and includes a bucket assembly 110. The bucket assembly 110 has an open sided configuration 112 for accommodating various sized containers including full rolling stock containers, half pack containers and the like. In an embodiment, the bucket assembly 110 includes a floor assembly 114 and a rear wall assembly having coplanar surfaces 116a and 116b for supporting the container during the tilting and other movements of the loading apparatus 100. The surface 116b, in one embodiment, is raised with respect to the surface 116a in order to ensure that the packages, when using a half-sized container, are properly positioned into the container while minimizing damage thereto, as well as other features described below. The bucket assembly 110 further includes opposing side walls 118. In an embodiment, the opposing side walls 118 are configured such that a bottom portion of each wall 118 is substantially the same size, in depth, as the floor assembly 114 and gradually slants inward toward the rear wall assembly, forming a substantially trapezoidal configuration. It should be well understood by those of ordinary skill in the art that other side wall configurations can equally be used with the invention.

The bucket assembly 110 further includes several sensors or photocell arrangements, 120A, 120B and 120C. The sensor or photocell arrangements may be pairs or sets of photocells or other arrangements and are, in an embodiment, used to provide feedback signals to a control system "C, which provides control to the loading apparatus 100. In one embodiment, the sensor or photocell arrangement 120A detects whether any number of different type containers (i.e., different sizes, shapes and loading capacities) is properly positioned within the bucket assembly 110. Upon detecting whether the container is properly positioned, the control system "C" provides control signals to the overall system that loading of packages into the container can begin. The control system "C", based on the signal provided by the sensor or photocell arrangement 120A and 102B, will be able to automatically resolve the capacity of the particular container within the bucket assembly 110. The photocell or other type of sensor 120B is capable of detecting other types of containers loaded within the bucket assembly.

Additionally, the photocell or other type of sensor 120C detects whether the container is fully loaded with packages or the like at a respective tilt position of the container. By way of example, at a first tilt position, the photocell or other type of sensor 120C will become blocked when the packages reach a certain level within the container. At this stage, the control system "C" will signal the loading apparatus 100 to index the container downward, allowing the packages to settle within the container. The photocell or other type of sensor 120C will then detect that additional space is available in the container (i.e., the sensors will not be blocked), allowing the introduction of further packages into the container. This process can continue for any number of incremental indexing until the container is completely filled thus increasing the throughput of the system, in general, while minimizing drop damage. In one embodiment, the container is capable of being indexed between a first tilt angle to a second, intermediate tilt angle to a fully upright position. Also, due to the "waterfall" effect of the coplanar surfaces 116a and 116b of the rear wall assembly, false trips of the sensors will be minimized, if not eliminated, when using a half sized container.

Still referring to FIG. 1, additional photocells or sensors, generally depicted as reference numerals 120D and 120E, may also be provided with the loading apparatus 100 of the invention. In one embodiment, the photocell or other type of sensor 120D may be used to detect the position of the container or bucket assembly 110, itself. For example, the photocell or other type of sensor 120D may be used to detect when the container (i.e., bucket assembly 110) is in the upright or down position, as well as other tilt angles or positions. The photocell or other type of sensor 120D may be several sensors strategically placed throughout the loading apparatus 100. A back-up sensor 120E may also be placed on the chute (FIG. 4)), and may be used in conjunction with the photocell or other type of sensor 120C. In an embodiment, the back-up sensor 120E detects whether packages are backed up on the chute, itself. This back-up sensor 120E may provide a signal to the control system "C" for indexing the container downward. The photocell or other type of sensor 120D also provides a signal to the control system "C" for controlling the loading apparatus 100.

Still referring to FIG. 1, the bucket assembly 110 is cradled within a cradle assembly 200. In turn, the cradle assembly 200 is mounted to a frame assembly 300. In one embodiment, the cradle assembly 200 includes a cradle shaft 210 which is coupled to a mounting system 310 of the frame assembly 300. The frame assembly 300 further includes a plurality of frame members 320, providing rigidity, stiffness and stability to the loading apparatus 100 of the invention. The cradle assembly 200 further includes a pair of lift ribs 220, rotatably coupled to a mount assembly 410 of an actuator assembly 400. The actuator assembly 400 is designed to tilt the bucket assembly 110, cradle assembly 200 and the frame assembly 300 between an upright position and tilt positions, as discussed below. The actuator assembly 400 may additionally position the loading apparatus 100 between a raised and lowered position.

The actuator assembly 400 may be a hydraulic system, air cylinder or screwtype system, amongst others. The actuator assembly 400 includes a linkage system 405, which upon actuation may assist in moving the loading apparatus 100 between positions. In one embodiment, the actuator assembly 400 is capable of tilting or indexing the loading apparatus 100 between upright and downward tilt positions. The actuator assembly 400 may also lift and lower the loading apparatus 100 between an upper and lower position or make other fine adjustments thereto. A safety sensor 415 is associated with the actuator assembly 400 and, in an embodiment, may be a kickout sensor. That is, the sensor 415 may detect when a package is being crushed or other problems are present in order to stop the downward movement of the loading apparatus 100. The sensor 415 provides a signal to the control system "C". In this state, for safety, it is contemplated that the loading apparatus 100 will be capable of tilting upward only so as to ensure no damage results to the package or loading apparatus 100, itself. A reset of the system is required after the kick-out 415 sensor has been activated. The actuator system may additionally include a positional feedback system 420 such as a resolver, encoder, timer or the like to control the movement of the loading apparatus 100.

Figure 2:
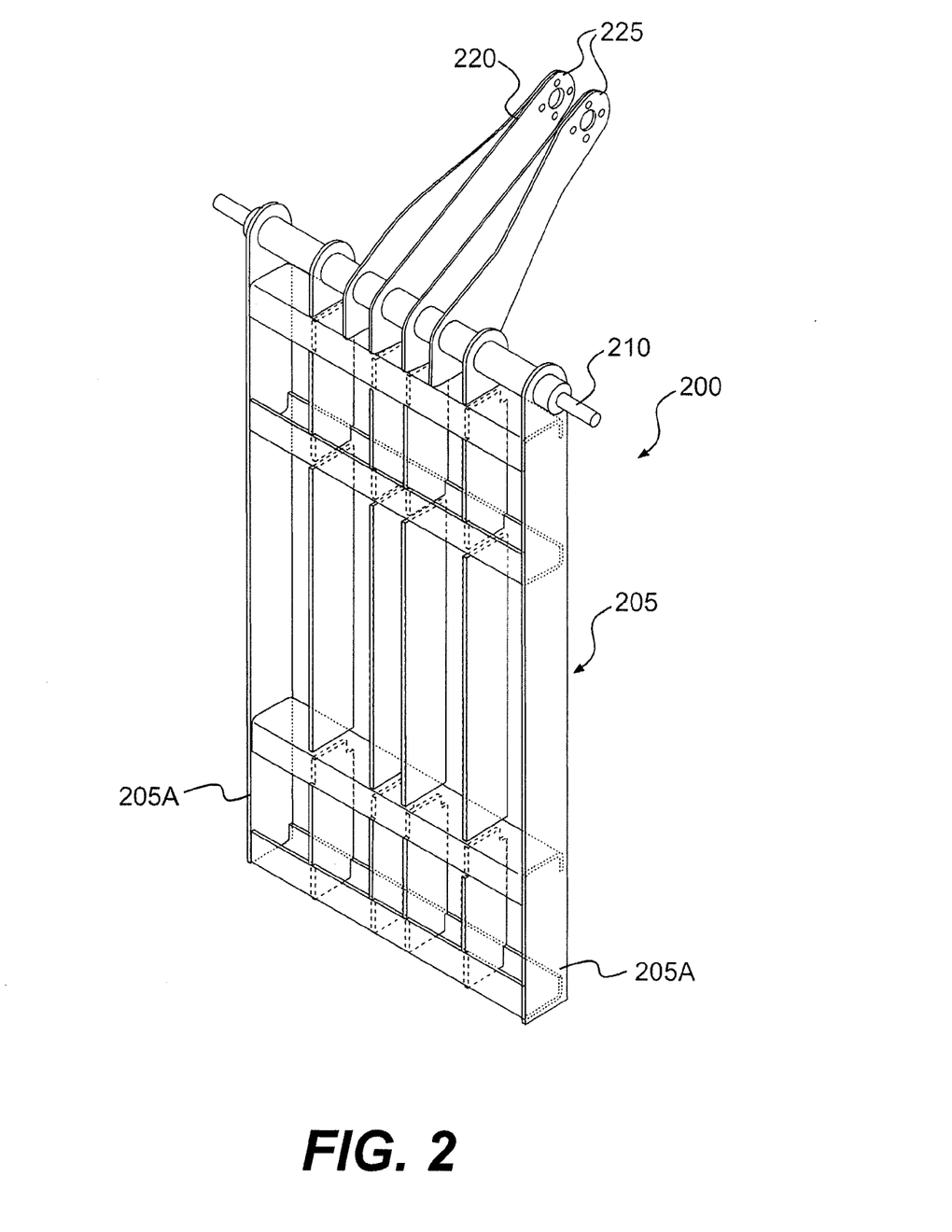
FIG. 2 shows a detail view of the cradle assembly of the invention.

FIG. 2 shows the cradle assembly of the invention. In this embodiment, the cradle assembly 200 includes a grid of vertical and horizontal frame members 205. The cradle shaft 210 extends past the outermost vertical frame members 205A. This allows the cradle shaft 210 to be coupled to the mounting system 310 of the frame assembly 310. In addition, the lift ribs 220 are secured to the cradle shaft 210 such that mounting holes 225, positioned remotely from the frame members 205, can mate with the mount assembly 410 of the actuator assembly 400.

Figure 3:
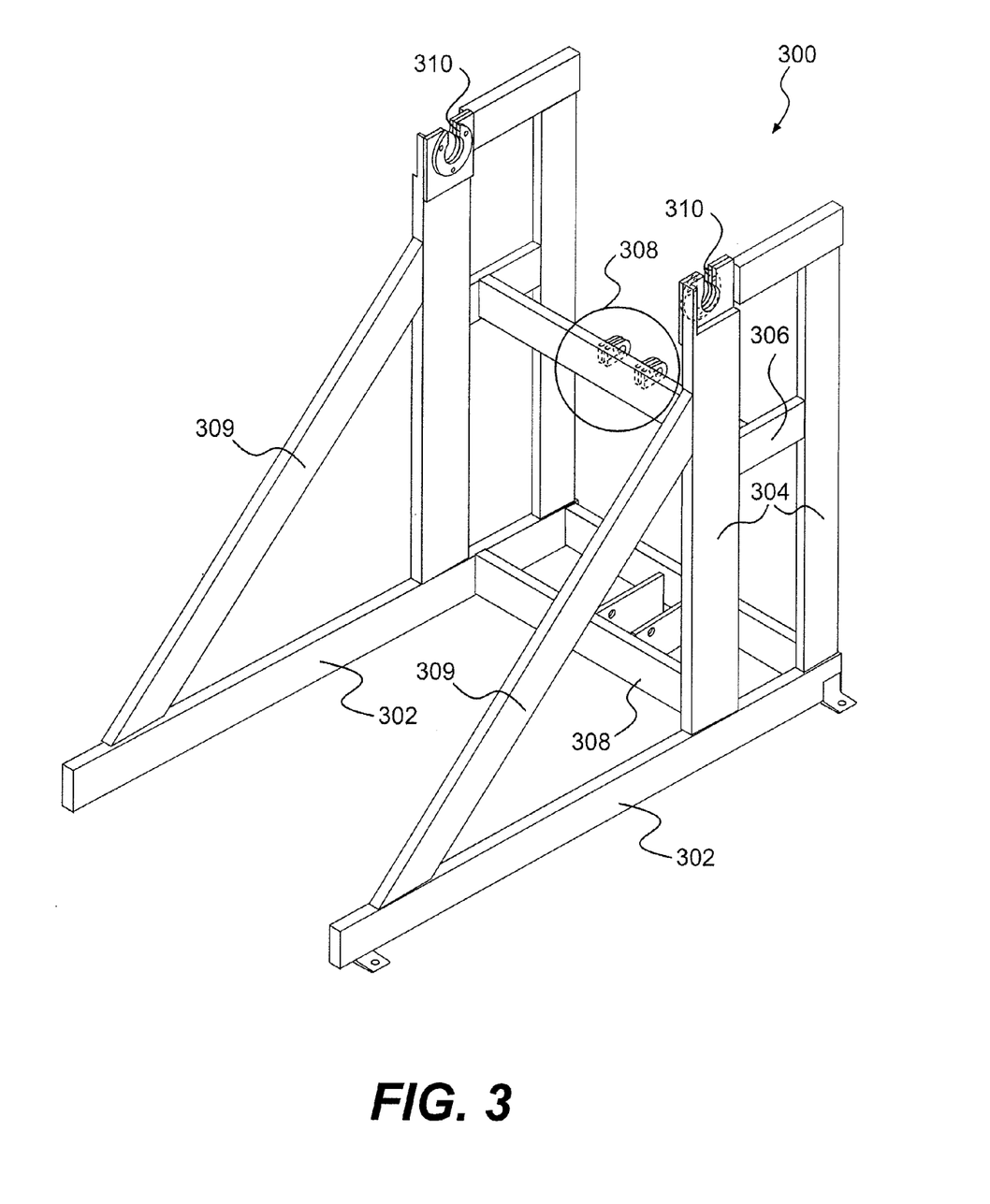
FIG. 3 shows a detail view of the frame assembly of the invention.

FIG. 3 shows a detail view of the frame assembly 300. The frame assembly 300 includes a set of horizontal frame members 302 mounted to a plurality of vertical frame members 304. Additional frame members 306 are mounted between the vertical frame members 304; whereas, additional cross frame members 308 are mounted between the horizontal frame members 302. The cross frame members 308 may additionally be mounted between the frame members 306 to provide rigidity and stiffness to the frame assembly 300. Frame members 309 may further be mounted between the vertical frame members 304 and the horizontal frame members 302. In one embodiment, the mounting system 310 of the frame assembly 300 is provided on opposing vertical frame members 304, and is designed to accommodate end shafts of the cradle shaft 210. In one embodiment, the mounting system 310 is a grommet type system.

Figure 4:
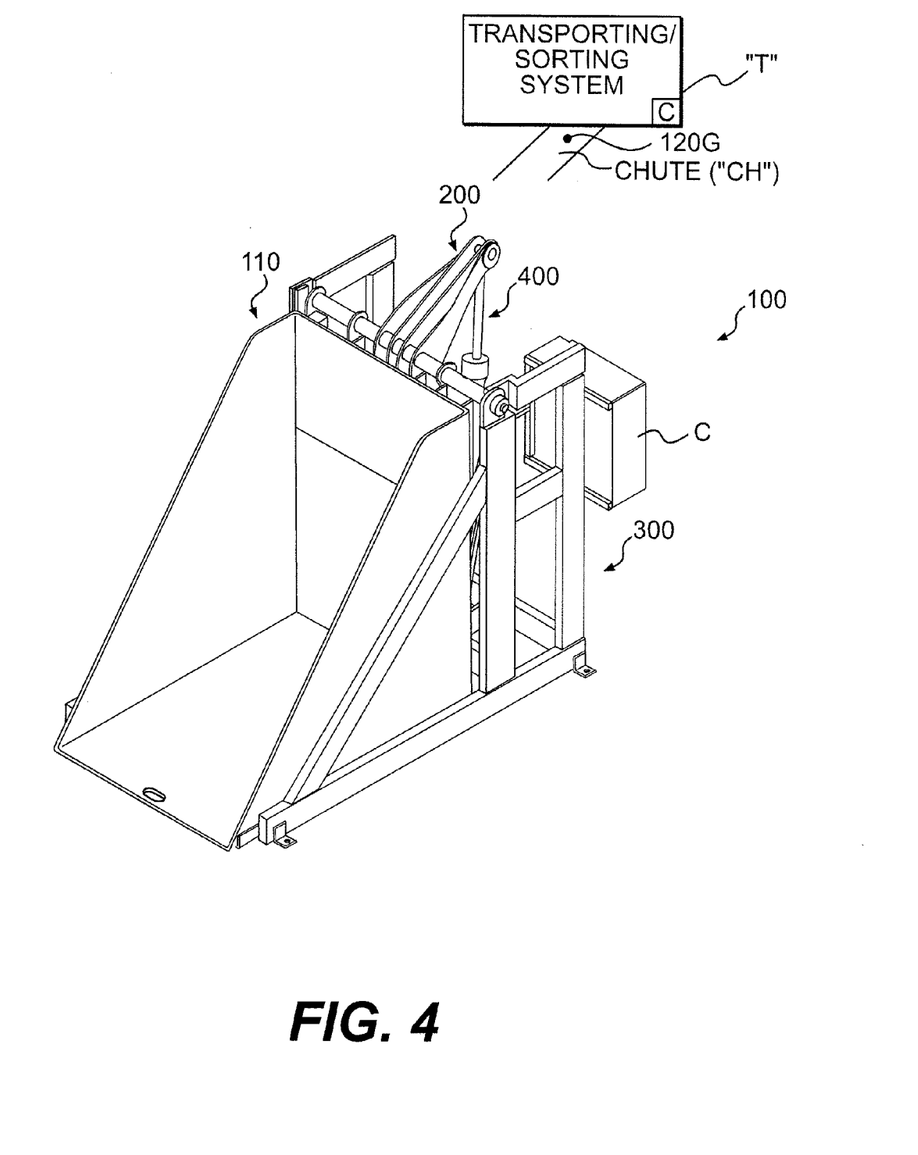
FIG. 4 shows the assembly of the invention in a first position.
Figure 5:
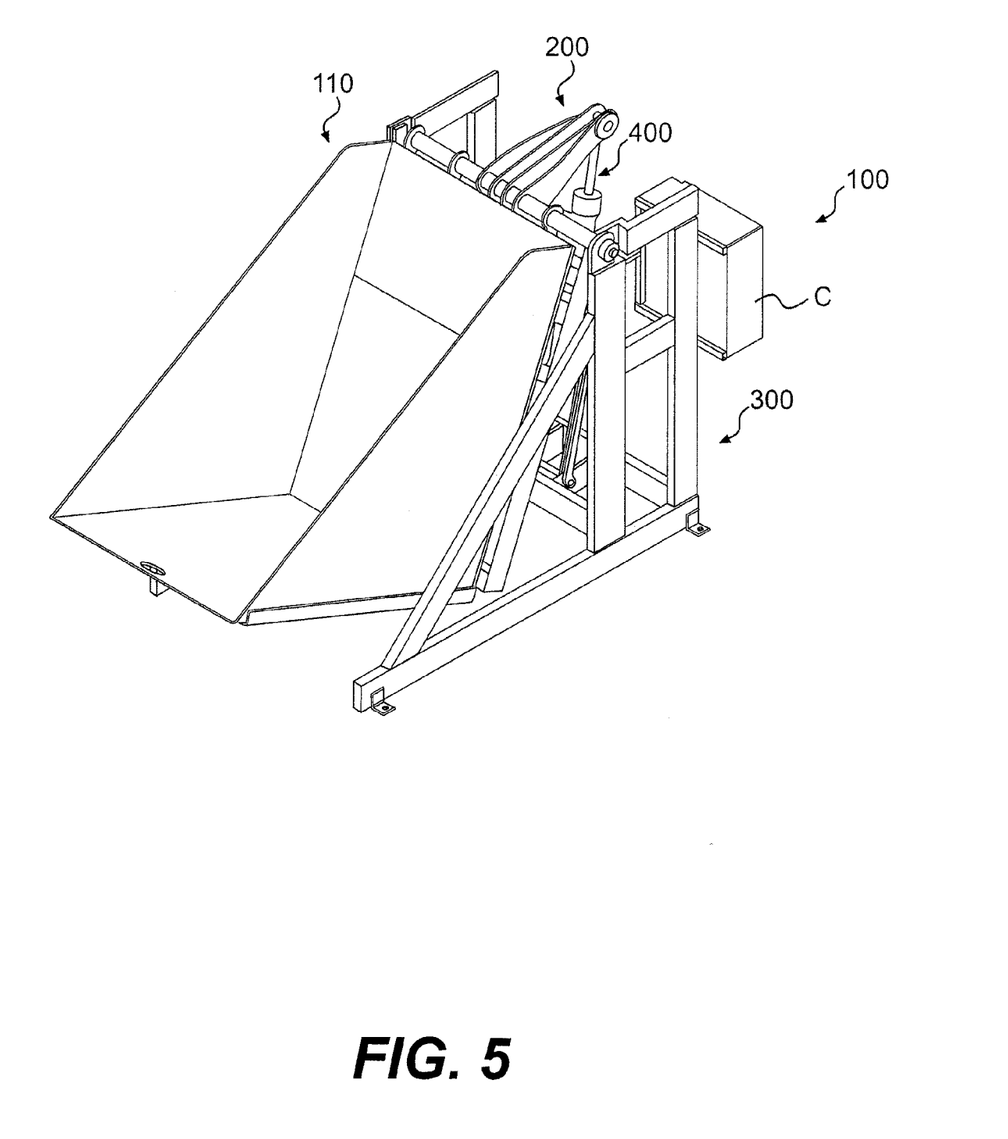
FIG. 5 shows the assembly of the invention in a second position.
Figure 6:
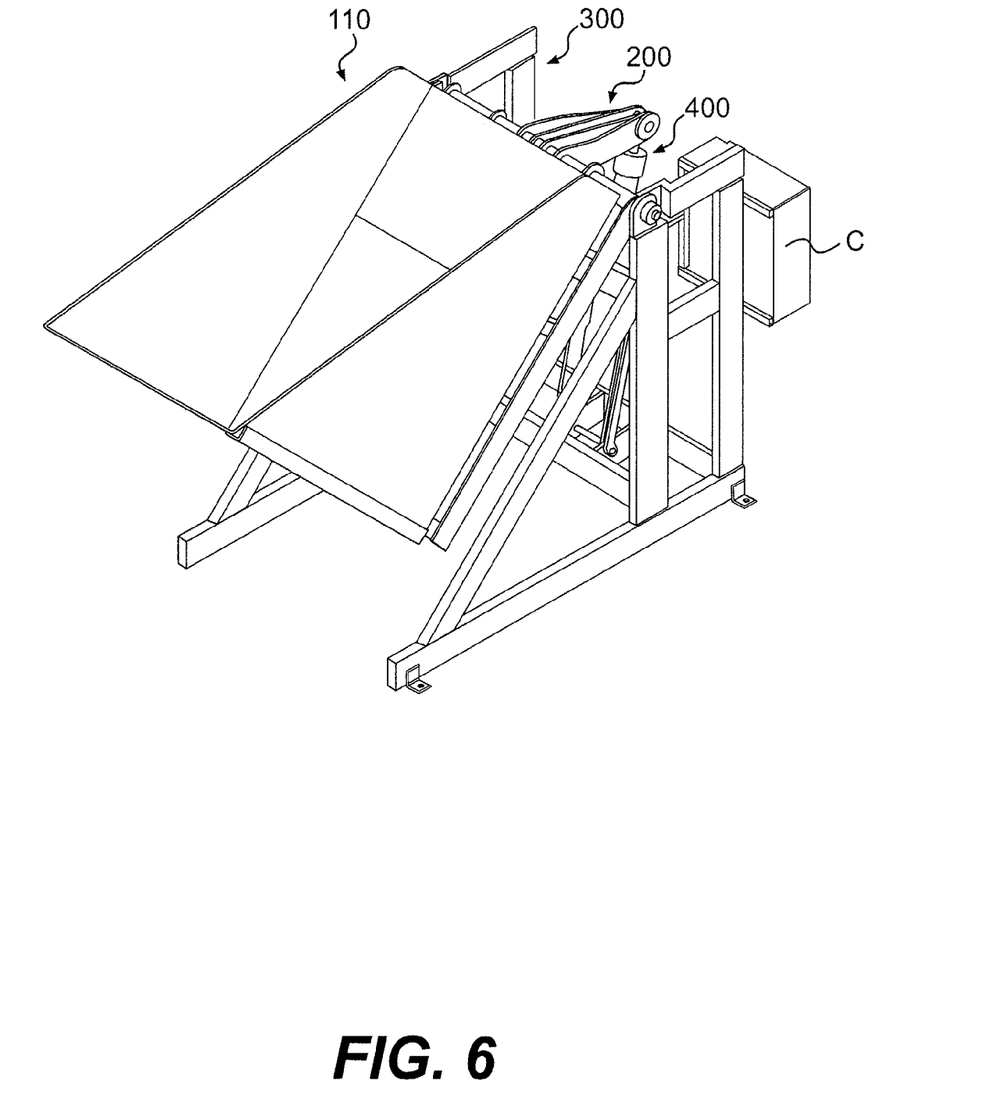
FIG. 6 shows the assembly of the invention in a third position.

FIGS. 4 through 6 show the loading apparatus 100 in various positions. FIG. 4 additionally shows the transporting and sorting system "T", including the chute "CH" and a control $C_1$. The control $C_1$ provides sorting and sequencing control to the system. The transporting system may be a monorail type system with titling trays for transporting the packages from induction to unloading. The sensor 420E is provided on or proximate to the chute "CH".

In FIG. 4, the loading apparatus 100 is in the down, non-tilted position. In FIG. 5, the loading apparatus 100 is in an intermediate tilt position. In FIG. 6, the loading apparatus 100 is in a fully titled position. As discussed above, in the fully titled position of FIG. 6, the packages will begin to be loaded within a container positioned within the bucket assembly 110. Upon detection that the container is full in this position, the control system "C" will direct the actuator assembly 400 to index the loading apparatus 100 to the intermediate tilt position of FIG. 5. In this position, the packages will be allowed to settle within the container thus creating additional space within the container. Additional packages may now be introduced into the container, at this tilt position, until the photocell or other type of sensor 120C becomes blocked. At this stage, the control system "C" will direct the actuator assembly 400 to index the loading apparatus 100 to the position of FIG. 7, at which time additional packages may be loaded in the container due to further settling of the packages. In this manner, indexing the container to certain tilt positions can increase the throughput and capacity of the system while minimizing damage to the package.

Figure 7:
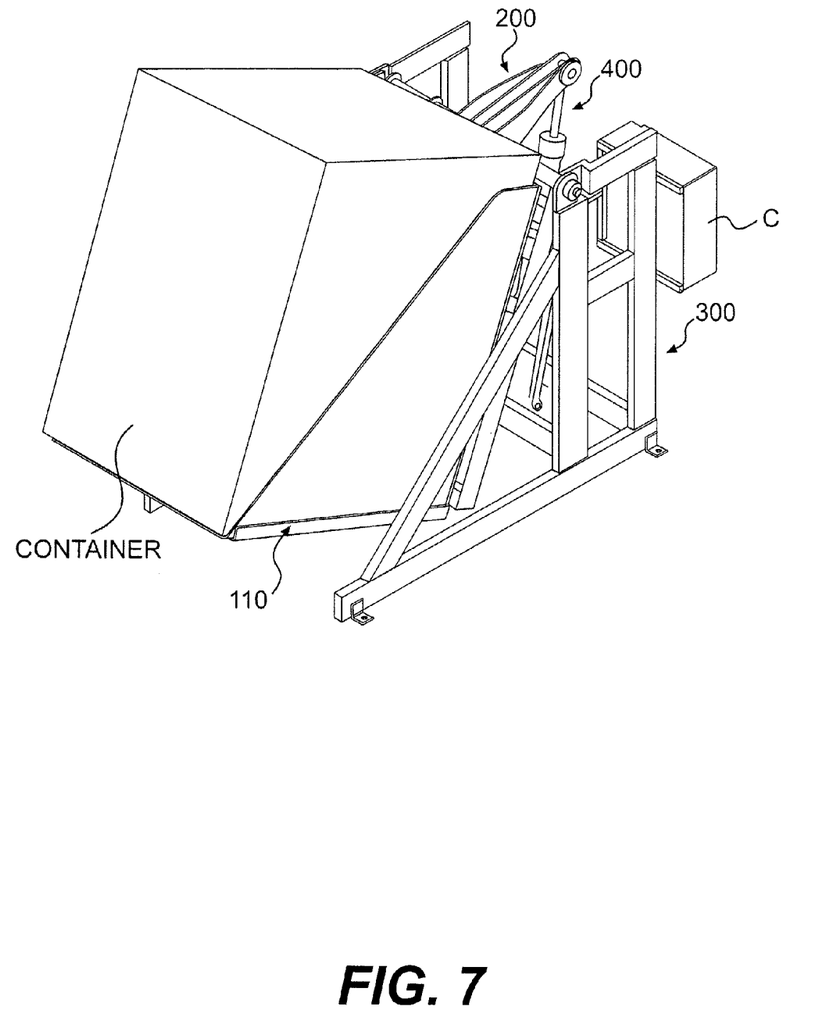
FIG. 7 shows the assembly with a container loaded therein.

FIG. 7 shows a container loaded on the bucket assembly 110. In the illustration, a full rolling stock container is loaded within the bucket assembly; however, a half pack container or a host of other sized and shaped containers can also be accommodated or loaded on the bucket assembly 110 of the invention. This is due to the innovative design of the bucket assembly 110, itself. The photocell or other type of sensor 120A detects the type of container and the proper positioning of the container on the bucket assembly 110.

EMBODIMENTS OF METHOD OF USE OF THE INVENTION

Figure 8:
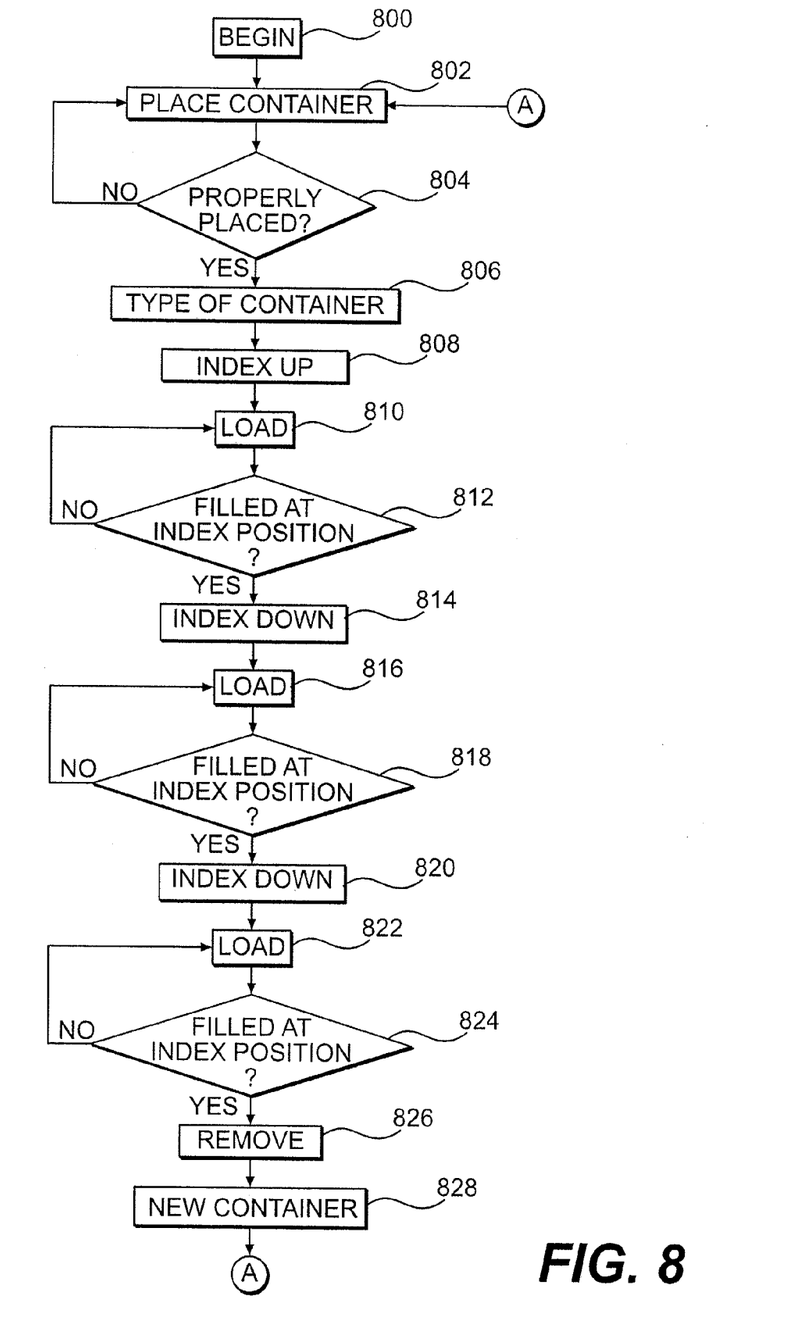
FIG. 8 is a flow diagram showing the steps implementing the control of the invention.

FIG. 8 is a flow diagram showing the steps implementing the control of the invention. It should be noted that the flow diagram of FIG. 8 may represent a high-level block diagram of the invention. A computer software program or hardwired circuit can be used to implement the steps of the invention. In the case of software, the program can be stored on media such as, for example, magnetic media (e.g., diskette, tape, or fixed disc) or optical media such as a CD-ROM. Additionally, the software can be supplied via the Internet or some other type of network. A workstation or personal computer that typically runs the software includes a plurality of input/output devices and a system unit that includes both hardware and software necessary to provide the tools to execute the steps of the invention Referring more specifically to FIG. 8, in step 800, the process begins. In step 802, a container is placed within the bucket assembly. In step 804, a determination is made as to whether the container is properly positioned within the bucket assembly. If not, step 802 is repeated. If yes, a determination is made as to the type of container loaded within the bucket assembly (step 808). This may be performed via a look-up table.

In step 810, the loading apparatus is indexed upward to begin the loading process. In step 812, a determination is made as to whether the container is filled in this indexed position. If no, the process continues through steps 810 and 812. If filled, the loading apparatus is indexed downward in step 814. This allows the packages to settle within the container, thus creating additional space. In step 816, loading begins at this indexed position. In step 818, a determination is made as to whether the container is filled in this indexed position. If no, the process continues through steps 816 and 818. If filled, the loading apparatus is indexed downward in step 820. This again allows the packages to settle within the container, thus creating additional space. In step 822, loading begins at this indexed position. In step 824, a determination is made as to whether the container is filled in this indexed position. If no, the process continues through steps 822 and 824. If filled, the loading apparatus is removed from the bucket assembly in step 826. In step 828, a new container may be loaded within the bucket assembly. Those of ordinary skill in the art should understand that steps 808 through 824 may be combined into a single control loop. At any point during this process, the sensors can detect the position of the loading apparatus, and the kick-out sensor 145 may detect a problem, stopping the system. In this latter mode, the loading apparatus may be indexed upward to correct any problems.

While the invention has been described in terms of embodiments, those skilled in the art will recognize that the invention can be practiced with modification within the spirit and scope of the appended claims.

It is claimed:

1. An apparatus for loading mail objects, comprising:
   a bucket assembly which holds a container;
   an actuator system moving the bucket assembly between at least an upright position, an intermediate tilt position and a full tilt position;
   at least one sensor which detects whether the bucket assembly has reached a fill capacity at each of the upright position, the intermediate tilt position and the full tilt position;
   a feedback control system which controls an indexing of the bucket assembly, via the actuator system, between the upright position, the intermediate tilt position and the full tilt position; and
   a chute sensor which detects package or mail object backlog within the chute upstream from the bucket assembly, wherein in the intermediate position, packages or other mail objects are permitted to settle within the bucket assembly such that additional packages or other mail objects can be introduced into the bucket assembly in the intermediate position.

2. The apparatus of claim 1, further comprising a sensor determining whether any variable sized mail holding container is properly positioned within the bucket assembly.

3. The apparatus of claim 1, wherein the intermediate tilt position and the full tilt position minimize damage to the packages or other mail objects.

4. The apparatus of claim 1, wherein the bucket assembly includes an open sided configuration for accommodating variable sized mail containers.

5. The apparatus of claim 1, further comprising a safety sensor associated with the actuator assembly to ensure shut down of the actuator assembly based on a detected problem.

6. The apparatus of claim 1, further comprising at least an additional sensor to detect other positions of the bucket assembly for providing signal controls to at least control movement of the bucket assembly.

7. The apparatus of claim 6, wherein the other positions is at least one of an upright and down position.

8. The apparatus of claim 1, further comprising a cradle assembly which holds the bucket assembly, the cradle assembly being coupled to the actuator system.

9. The apparatus of claim 8, wherein the cradle assembly includes a cradle shaft coupled to a mounting system of a frame assembly.

10. The apparatus of claim 8, wherein the cradle assembly further includes lift ribs coupled to a mount assembly of the actuator system.

11. The apparatus of claim 1, wherein the actuator system is one of a hydraulic system, air cylinder and screw-type system.

12. The apparatus of claim 1, wherein the actuator system includes a linkage system which assists in the titling and other movements of the bucket assembly.

13. The apparatus of claim 1, wherein the bucket assembly includes a floor assembly and a rear wall assembly for supporting any variable sized containers, the rear wall assembly including one surface raised with respect to another surface.

14. The apparatus of claim 13, wherein the raised surface permits packages to be introduced into a half sized container while minimizing false trips of at least one of the at least one sensors.

15. The apparatus of claim 1, wherein the feedback control system is a positional feedback system associated with the actuator assembly for controlling the movement of the bucket assembly.

16. A loading system, comprising:
    a transporting and sorting system, including:
       an induction mechanism that introduces packages onto a transporting system which transports the packages from the induction mechanism to a plurality of drop off positions;
       a chute associated with each of the plurality of drop off positions; and
    a loading apparatus, comprising:
       a bucket assembly which holds a container; an actuator system moving the bucket assembly between at least an upright position, an intermediate tilt position and another tilt position;
       at least one sensor which detects whether the bucket assembly has reached a fill capacity at each of the upright position, the intermediate tilt position and the another tilt position;
       a feedback control system which controls an indexing of the bucket assembly, via the actuator system, between the upright position, the intermediate tilt position and the another tilt position;
       a sensor determining whether the container is properly positioned within the bucket assembly;
       a safety sensor associated with the actuator system ensuring shut down of the actuator system based on a detected problem; and
       at least an additional sensor to detect at least one of an upright and down position of the bucket assembly; and
       a chute sensor located proximate to the chute which detects package backlog on the chute.

17. The loading apparatus of claim 16, wherein the feedback control system is a positional system associated with the actuator system.

18. The loading apparatus of claim 16, wherein the feedback control system includes position sensors providing feedback signals to a controller for indexing the movement of the bucket assembly.

* * * * *